United States Patent [19]

Back

[11] 4,386,785
[45] Jun. 7, 1983

[54] SHAFT SEALS INCLUDING A SEAL ELEMENT AND A DRIVE RING ASSEMBLY THEREFOR

[75] Inventor: Anthony C. Back, Slough, England

[73] Assignee: Crane Packing Limited, Slough, England

[21] Appl. No.: 369,893

[22] Filed: Apr. 19, 1982

[30] Foreign Application Priority Data

Apr. 21, 1982 [GB] United Kingdom ................ 8112403

[51] Int. Cl.$^3$ .......................... F16J 15/36; F16J 15/38
[52] U.S. Cl. ........................................ 277/82; 277/89; 277/93 SD; 277/126; 277/144
[58] Field of Search ................ 277/42, 43, 81 R, 82, 277/84, 85, 88–91, 93 R, 93 SD, 126, 144, 145, 170–172

[56] References Cited

U.S. PATENT DOCUMENTS

| | | | |
|---|---|---|---|
| 1,569,751 | 1/1926 | Higgins | 277/82 X |
| 4,103,904 | 8/1978 | Tankus | 277/89 X |
| 4,114,904 | 9/1978 | Wentworth | 277/88 |
| 4,136,887 | 1/1979 | Wentworth | 277/43 |

FOREIGN PATENT DOCUMENTS 572278 10/1945 United Kingdom .................. 277/89
837793 7/1960 United Kingdom .................. 277/88

*Primary Examiner*—Robert S. Ward, Jr.
*Attorney, Agent, or Firm*—Kemon & Estabrook

[57] ABSTRACT

A shaft seal including a sealing element and a drive ring assembly for mounting the sealing element with respect to a shaft, for rotation therewith; the drive ring assembly comprising a pair of concentric rings one mounted within the bore of the other, a plurality of circumferentially spaced radial clamping screws in screw threaded engagement with the outer ring, so that they may be tightened against the outer surface of the inner ring, the abutting surfaces of the screws and the inner ring being mutually inclined, so that tightening of the screws against the inner ring, will cause the inner ring to move axially towards a shoulder on the bore of the outer ring, so as to compress a sealing ring positioned between the shoulder and the opposed end of the inner ring, thereby causing the sealing ring to expand radially into sealing engagement with the opposed surfaces of the shaft and the outer ring, while at the same time said screws deform the inner ring into clamping engagement with the shaft.

10 Claims, 3 Drawing Figures

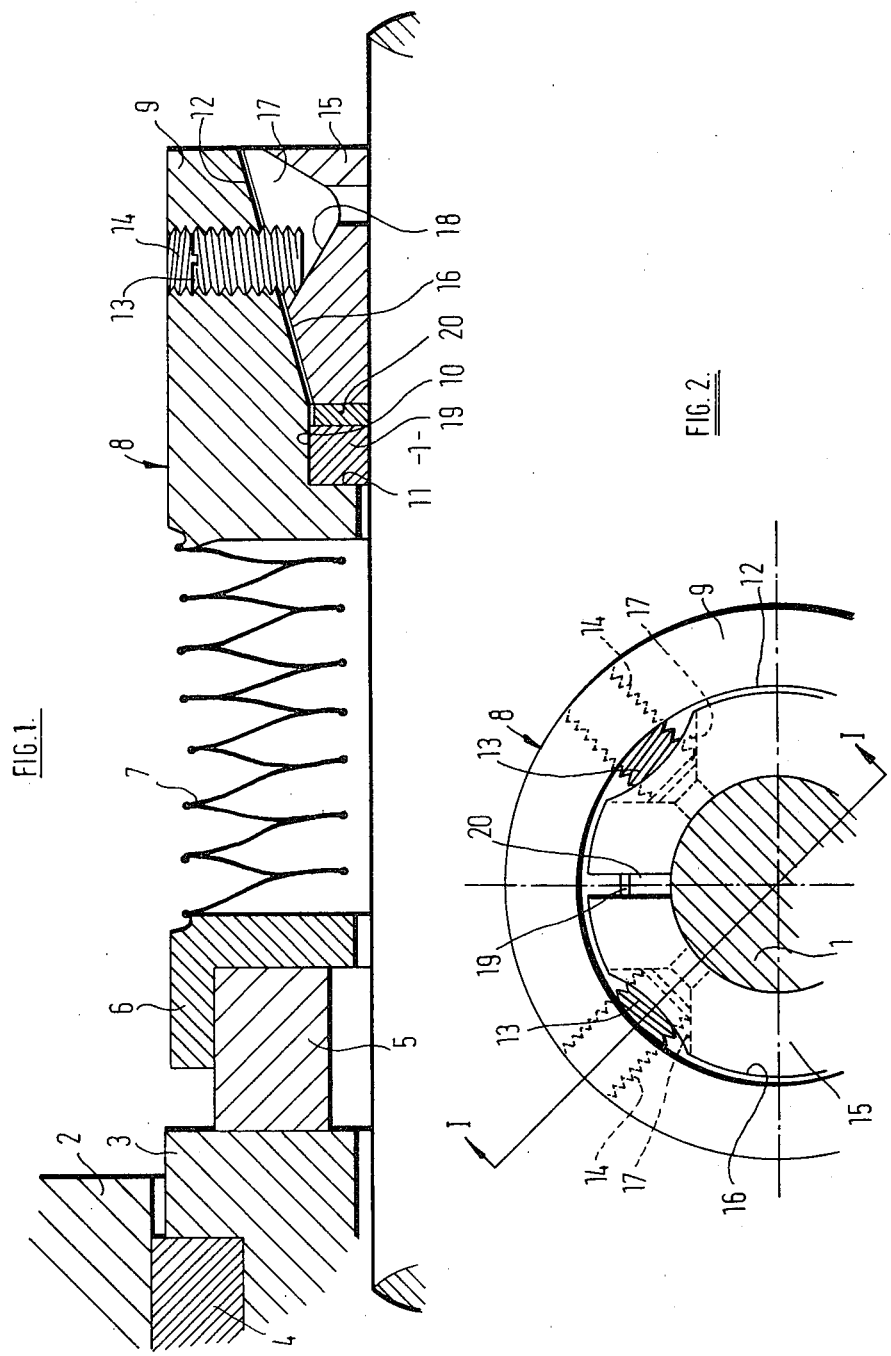

SHAFT SEALS INCLUDING A SEAL ELEMENT AND A DRIVE RING ASSEMBLY THEREFOR

This invention relates to shaft seals and in particular to a method of securing the sealing element associated with the shaft, to the shaft; in a manner such as to provide drive to the sealing element.

Hitherto the sealing elements of shaft seals which are associated with the shaft, have been attached to the shaft by means of a ring or collar which in turn is secured to the shaft by means of a plurality of circumferentially spaced radial clamping screws, these screws being tightened against the shaft to clamp the ring or collar thereto. With this method of securing the sealing element to the shaft, the clamping screws indent the surface of the shaft, making removal of the sealing element difficult and also necessitating the removal of any burrs so caused, so as not to damage the sealing elements when refitting the seal. Independant sealing means is also required between the shaft and the ring or collar.

According to one aspect of the present invention a shaft seal includes a sealing element and a drive ring assembly for mounting the sealing element with respect to a shaft, for rotation therewith; said drive ring assembly which is adapted to be mounted around a shaft comprising; an outer ring, the bore of which is enlarged towards one end, so that a radially or substantially radially extending shoulder is provided part way along its length; a radially deformable inner ring co-axial with the outer ring and located in the enlarged bore portion thereof; and a sealing ring located in the enlarged bore portion of the outer ring between the shoulder thereof and the opposed end of the inner ring; a plurality of circumferentially spaced radial screws engaging in corresponding threaded holes in the portion of the outer ring surrounding the inner ring, so that they may be tightened against the outer surface of the inner ring, the engaging surfaces of the screws and the inner ring being mutually inclined, so that tightening of the screws against the inner ring, when the assembly is positioned about a shaft, will force the inner ring to move axially towards the shoulder of the outer ring, thereby compressing the sealing ring positioned therebetween and causing the sealing ring to expand radially into sealing engagement with the opposed surfaces of the shaft and the outer ring, while at the same time said screws deform the inner ring into clamping engagement with the shaft.

Preferably each of the radial screws engage an inclined portion of the outer surface of the inner ring, this inclined portion being positioned axially between the axes of the screw and the shoulder of the outer ring, so that tightening of the screw will cause axial movement of the inner ring towards the shoulder, while at the same time applying a radial clamping load to the inner ring. The outer surface may be provided with a series of inclined surface portions which are positioned circumferentially to coincide with the circumferential positions of the radial screws. Such inclined surface portions may be in the form of conical depressions, which may for example be pressed in the inner ring or be in the form of counter-sunk holes. Alternatively, the inclined surface may be provided by a circumferential "V" section groove.

In order to permit radial deformation of the inner ring, a split ring may be used. Alternatively, a closed ring of relatively light cross-section which is sufficiently flexible to permit the necessary deformation of the ring onto the shaft under the load applied by the radial screws, may be used. Where a split ring is used, in order to ensure a fluid tight seal, a closed back-up ring may be provided between the sealing ring and the split inner ring.

In order to provide secure location of the outer ring with respect to the shaft, the inner ring should be a tight fit within the bore of the outer ring, when the drive ring assembly is clamped upon the shaft. Where this is not the case, and the only contact between the inner and outer rings is via the radial screws, it is possible that the outer ring may be rocked relative to the inner ring. In order to avoid this problem, and also the need to produce the inner and outer rings to very close tolerances, the bore of the outer ring and the outer surfaces of the inner ring may be conical tapering towards the shoulder of the outer ring. In this manner as the inner ring moves axially towards the shoulder of the outer ring in order to compress the sealing ring, the opposed surfaces of the inner and outer ring will also close together, so that when the drive ring is assembled on a shaft, the inner and outer rings will be brought into continuous circumferential engagement and the outer ring will thus be rigidly mounted with respect to the inner ring and the shaft.

The invention is now described, by way of example only, with reference to the accompanying drawings, in which:

FIG. 1 shows diagramatically, in cross section along line I—I in FIG. 2, a bellows seal formed in accordance with the present invention;

FIG. 2 shows a partial end view of the seal, shown in FIG. 1; and

Figure 3:
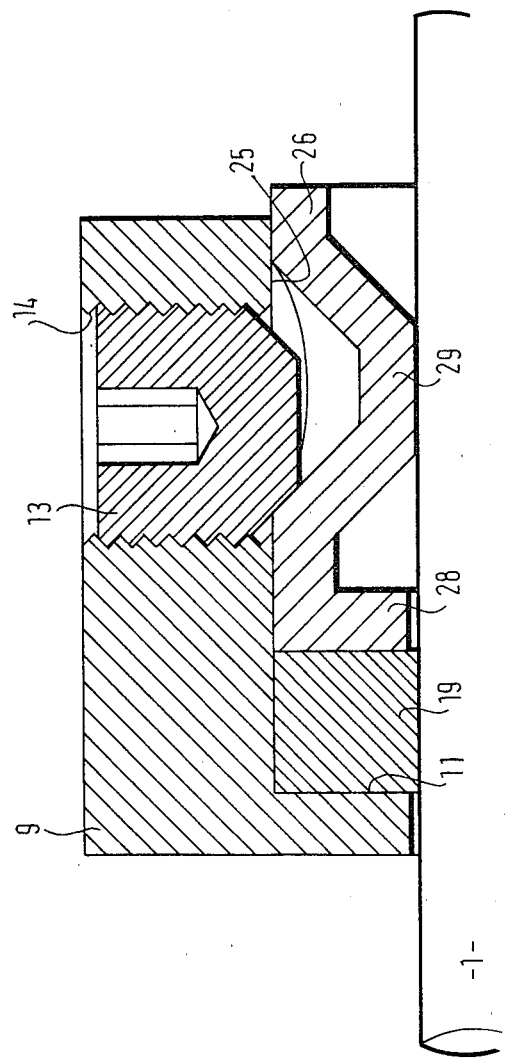
FIG. 3 shows diagramatically in cross section an alternative form of drive ring assembly for a seal formed in accordance with the present invention.

As illustrated in the accompanying drawings, a mechanical face seal between a rotary shaft and housing 2 comprises an annular seat member 3 which is sealed into a recess in the housing 2 by an expanded graphite ring 4.

The sealing member 5 associated with the shaft 1, is held in contact with the seat 3 by means of a retaining ring 6 and metal bellows unit 7, the metal bellows unit 7 being welded to and acting against a drive ring assembly 8, in conventional manner.

The drive ring assembly 8 comprises an outer ring 9 having a bore which is slightly greater in diameter than the diameter of the shaft 1 at the end to which the bellows unit 7 is secured. The bore opens to form a recessed intermediate portion 10 with a radially extending shoulder 11 and has a conical rearward portion 12. A plurality of circumferentially spaced radial clamping screws 13 are provided in corresponding screw threaded holes 14 in the portion of the ring 9 having the conical bore 12. A longitudinally split ring 15, having a parallel bore slightly greater in diameter than the diameter of the shaft 1 and having a conical outer surface 16, which corresponds with the conical portion 12 of the bore of the outer ring 9, is located within the conical portion 12 of the bore of the ring 9. A plurality of counter-sunk holes 17 are provided in the split ring 15, these holes 17 corresponding circumferentially in position to the clamping screws 13, but being axially misaligned so that each of the screws 13 will engage the innermost sloping side 18 of one of the counter-sunk holes 17.

An expanded graphite packing ring 19 is located in the recessed portion 11 of the bore of ring 9 and a back-up ring 20 is located between this packing ring 19 and the inner end of the split ring 15.

In order to assemble the bellows seal described above, the seat 3 is secured to the housing 2 and sealed thereto by means of the expanded graphite ring 4, in known manner. The sealing member 5, with the retaining ring 6, bellows unit 7 and drive ring assembly 8, are then positioned on the shaft 1 and when in position, the drive ring assembly 8 is clamped and sealed to the shaft 1 by means of clamping screws 14. As each of the screws 14 are tightened against the sloping side 19 of the counter-sunk hole 17 associated therewith, the split ring 15 is moved axially with respect to the outer ring 9, towards the shoulder 11. As the split ring 15 moves axially with respect to the outer ring 9 the conical surfaces 12 and 16 are brought into continuous circumferential engagement, thereby clamping the outer ring 9 with respect to the split ring 15. At the same time, the split ring 15 is forced by the screws 13 into engagement with the shaft 1, thereby clamping the whole assembly in position on the shaft 1. The axial movement of the split ring 15 also compresses the packing ring 19 axially between the shoulder 11 and the back-up ring 20, thus causing the packing ring 19 to expand radially against the surface of the shaft 1 and the bore 10 of the ring 9, to provide a fluid tight seal.

In the shaft seal arrangement described above, the drive ring assembly 8 is clamped to the shaft 1 over the whole of the surface area of the bore of the split ring 15. As a result, there will be no distortion of the shaft 1 which will present difficulties when replacing the sealing member 5, as would occur with seals used hitherto in which the clamping is provided by the point contact of the ends of radial clamping screws, with the shaft. By using expanded graphite packing rings 4 and 19, for sealing both the seat 3 and the drive ring assembly 8, the seal described above can be used safely over a wide range of temperatures.

In the embodiment illustrated in FIG. 3, the outer ring 9 is provided with a plain cylindrical counter-bore 25. A closed inner ring 26 of L shaped section, having an inwardly directed flange 28, is machined to a close fit within the counter-bore 25 of the outer ring 9. The inner ring 26 is provided with a series of pressed conical depressions 29 in its cylindrical surface, these conical depressions 29 being positioned such that they co-act with a series of radial screws 13, which are provided in screw threaded holes 14, in a counter-bore portion of the outer ring 9, in a manner similar to the counter-sunk holes 18 described with reference to the embodiment shown in FIG. 1.

As illustrated in FIG. 3, the drive ring assembly is mounted upon a shaft 1 with the inner ring 26 within the counter-bore 25 of the outer ring 9 and an expanded graphite sealing ring 19 is positioned between the shoulder 11 of the outer ring 9 and the flange portion 28 of the inner ring 26. As the flange portion 28 is continuous, there is no need in this embodiment for the back-up ring 20 used in the embodiment shown in FIG. 1.

As the radial screws 13 are tightened against the inclined surface of the conical depressions 29, the inner ring will be moved axially towards the shoulder 11 of the outer ring, thereby compressing the sealing ring 19 to provide a seal between the opposed surfaces of the shaft and the outer ring 9. At the same time, the inner ring 26 is deformed radially, so that the conical depressions 29 will be brought into clamping engagements with the shaft 1.

While in this embodiment, the inner ring 26 is only clamped to the shaft 1 over a relatively small areas, in comparison with the embodiment illustrated in FIG. 1, distortion of the shaft will still be much smaller than that resulting from the use of radial screws clamping directly onto the shaft, as was done in the past.

Various modifications may be made without departing from the present invention. For example, while in the embodiments described above, inclined surfaces are provided on the outer surface of the inner ring, alternatively the radial screws may be provided with conical end portions which engage vertical portions of the inner ring. Also while the drive ring assembly described has been used in conjunction with metal bellows units, the assembly may be used for other types of mechanical face seals which use seal envelopes other than bellows units. The drive ring assembly may also be used for retaining the seat 3, where there is mounted for rotation with the shaft 1 rather than in fixed relationship to the housing, or in order to seal, for example, a sleeve to a shaft.

I claim:

1. A shaft seal including a sealing element and a drive ring assembly for mounting the sealing element with respect to a shaft, for rotation therewith; said drive ring assembly which is adapted to be mounted around a shaft comprising; an outer ring the bore of which is enlarged towards one end, so that a radially or substantially radially extending shoulder is provided part way along its length; a radially deformable inner ring co-axial with the outer ring and located in the enlarged bore portion thereof; and a sealing ring located in the enlarged bore portion of the outer ring between the shoulder thereof and the opposed end of the inner ring; a plurality of circumferentially spaced radial screws engaged in correspondingly threaded holes in the portion of the outer ring surrounding the inner ring, so that they may be tightened against the outer surface of the inner ring, the engaging surfaces of the screws and the inner ring being mutually inclined, so that tightening of the screws against the inner ring, when the assembly is positioned about a shaft, will force the inner ring to move axially towards the shoulder of the outer ring, thereby compressing the sealing ring positioned therebetween and causing the sealing ring to expand radially into sealing engagement with the opposed surfaces of the shaft and the outer ring, while at the same time said screws deform the inner ring into clamping engagement with the shaft.

2. A shaft seal according to claim 1 in which each screw engages an inclined portion of the outer surface of the inner ring, said inclined portion being disposed on the side of the axes of the screw nearest to the shoulder of the outer ring.

3. A shaft according to claim 2 in which each inclined portion of the surface of the inner ring, is provided by a conical depression in the inner ring, a series of conical depressions being provided in the inner ring corresponding circumferentially to the positions of the screws.

4. A shaft seal according to claim 2 in which the inclined portion of the surface of the inner ring is provided by a circumferential "V" section groove.

5. A shaft seal according to claim 1 in which the inner ring is split in order to permit radial deformation.

6. A shaft seal according to claim 5 in which an annular back-up ring is provided between the sealing ring and the split inner ring.

7. A shaft seal according to claim 1 in which the bore of the outer ring and the outer surface of the inner ring are conical, reducing in diameter towards the shoulder of the outer ring, so that as the inner ring is moved axially towards the shoulder of the outer ring, the opposed surfaces of the inner and outer rings will be brought together into continuous circumferential engagement, thereby clamping the outer ring with respect to the inner ring and thus with respect to the shaft.

8. A shaft seal according to claim 1 in which the inner ring is formed from a closed ring of light cross-section.

9. A shaft seal according to claim 1 in which the sealing ring is made from expanded graphite material.

10. A shaft seal according to claim 1 in which a metal bellows unit is secured at one end to the outer ring of the drive ring assembly and at the other end to a sealing element.

* * * * *